United States Patent Office 3,748,339
Patented July 24, 1973

3,748,339
2-[3-[1-(DIMETHYLAMINO)ALKYL] - 1,5-DIHYDRO-
5-OXO - 1 - SUBSTITUTED-4H-1,2,4-TRIAZOL-4-
YL]BENZOPHENONE AND PROCESS
Martin Gall, Kalamazoo, Mich., assignor to The Upjohn Company, Kalamazoo, Mich.
No Drawing. Filed May 5, 1972, Ser. No. 250,530
Int. Cl. C07d 55/06, 57/00, 99/02
U.S. Cl. 260—308 C          5 Claims

ABSTRACT OF THE DISCLOSURE

2-[3 - [1 - (dimethylamino)alkyl]-1,5-dihydro-5-oxo-1-substituted - 4H - 1,2,4 - triazol-4-yl]benzophenone of the Formula II

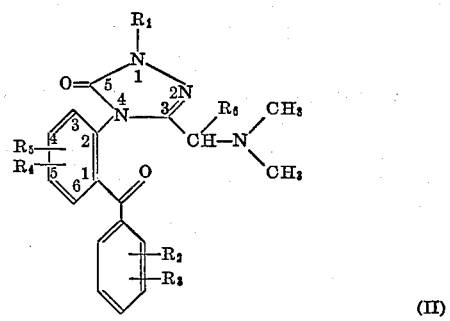

wherein $R_1$ is selected from the group consisting of hydroxymethyl and

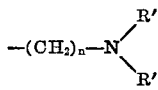

in which $n$ is 2 or 3 and $R'$ is alkyl of 1 to 3 carbon atoms, inclusive, or together

is a heterocyclic ring moiety selected from the group consisting of pyrrolidino, piperidino, morpholino, and 4-alkylpiperazino in which alkyl is defined as above; and wherein $R_2$, $R_3$, $R_4$ and $R_5$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino, in which the carbon chain moiety is of 1 to 3 carbon atoms, inclusive, and dialkylamino in which alkyl is defined as above; and wherein $R_6$ is hydrogen or alkyl defined as above, are produced by reacting a 2-substituted-5-phenyl-4H-s-triazolo[4,3-a][1,4]benzodiazepine-1-one of the Formula (I):

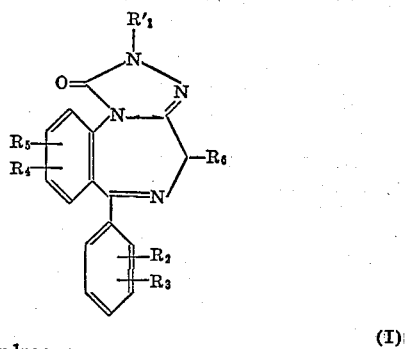

wherein $R'_1$ is hydrogen or

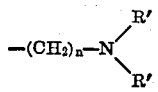

defined as above, and $R_2$, $R_3$, $R_4$, $R_5$, and $R_6$ are defined as above with formic acid and formaldehyde, to give the corresponding compound of Formula II.

The new products of Formula II including their pharmacologically acceptable acid addition salts are useful as sedatives, tranquilizers, and muscle relaxants in mammals and birds.

BACKGROUND OF THE INVENTION

Field of the invention

This invention is directed to new organic compounds and is particularly concerned with novel 2-[3-[1-(dimethylamino)alkyl] - 1,5 - dihydro-5-oxo-1-substituted-1,2,4-triazol-4-yl]benzophenones and a process for the production thereof.

The novel compounds and the process of production therefor can be illustratively represented as follows:

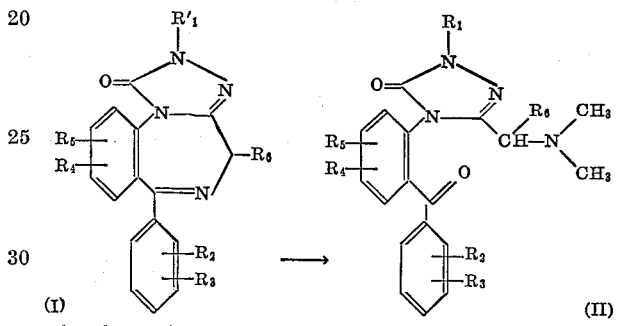

wherein $R_1$ is selected from the group consisting of hydroxymethyl and

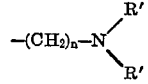

in which $n$ is 2 or 3 and $R$, is alkyl of 1 to 3 carbon atoms, inclusive, or together

is a heterocyclic ring moiety selected from the group consisting of pyrrolidino, piperidino, morpholino, and 4-alkylpiperazino in which alkyl is defined as above; and wherein $R_2$, $R_3$, $R_4$, and $R_5$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino, in which the carbon chain moiety is of 1 to 3 carbon atoms, inclusive, and dialkylamino in which alkyl is defined as above; and wherein $R_6$ is hydrogen or alkyl defined as above; and wherein $R'_1$ is hydrogen or

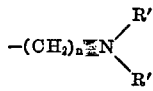

defined as above.

The novel compounds of the Formulae II including acid addition salts thereof have sedative, tranquilizing, hypnotic, muscle relaxant and anticonvulsant effects in mammals including man and birds. They also are useful as feed additives for increasing the growth rate and feed efficiency of livestock and poultry, the milk production during lactation in the mammalian species and the egg production in the avian species.

The acid addition salts of compounds of Formula II contemplated in this invention, are the hydrochlorides, hydrobromides, hydroiodides, sulfates, phosphates, cyclohexanesulfamates, methanesulfonates and the like, prepared by reacting a compound of Formula II with an excess of the selected pharmacologically acceptable acid.

Sedative effects of 2′,5-dichloro-2-[3-[(dimethylamino)methyl] - 1 - hydroxymethyl-1,5-dihydro-5-oxo-4H-1,2,4-triazol-4-yl]benzophenone are shown by the following tests in mice:

Chimney test: [Med. Exp. 4, 145 (1961)]: The effecttive intraperitoneal dosage for 50% of the mice tested ($ED_{50}$) is 0.45 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test is 1.0 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 1.6 mg./kg.

Nicotine antagonism test: Mice in a group of 6 are injected with the test compound, 2′,5-dichloro-2-[3-[(dimethylamino)methyl] - 1 - hydroxymethyl-1,5-dihydro-5-oxo-4H-1,2,4-triazol-4-yl]benzophenone. Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of .125 mg./kg. of the test compound protected 50% of the mice against (2) and (3).

5 - chloro - 2 - [3 - [(dimethylamino)methyl]-1-[dimethylamino)ethyl] - 1,5-dihydro-5-oxo-4H-1,2,4-triazol-4-yl]benzophenone shows activity in the above described tests as follows:

| Tests: | $ED_{50}$ in mg./kg. (mice) |
| --- | --- |
| Chimney | 40 |
| Dish | 28 |
| Pedestal | 56 |
| Nicotine (3) | 6.3 |

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphates, cornstrach, stearic acid, methylcellulose, and the like may be used as carriers or for coating purposes. Oil, e.g., coconut oil, sesame oil, safflower oil, cottonseed oil, peanut oil, or water may be used for preparing solutions or suspensions of the active drug. Sweetening, coloring, and flavoring agents may be added.

For mammals and birds, food premixes, with starch, oatmeal, dried fishmeat, fishmeal flour, and the like can be prepared.

As tranquilizers, the compounds of Formula II can be used in dosages of 0.1 mg. to 20 mg./kg. in oral or injectable preparations as described above, to alleviate tension and anxiety in mammals or birds, such as e.g., occurs when animals are shipped.

Other acid addition salts of the compounds of Formula II can be made, such as the fluosilicic acid addition salts which are useful mothproofing compounds or the trichloroacetates useful as herbicides against Johnson grass, Bermuda grass, yellow foxtail, and green foxtail, and quack grass.

The starting matetrials 1 - substituted - 2,4-dihydro-6-phenyl-1H-s-triazolo[4,3-a][1,4]benzodiazepin-1-ones of Formula I of this invention, are described in U.S. Pat. 3,646,055 or in the subsequent preparations.

In carrying out the process of this invention an aqueous formic acid solution of the selected starting material (I) is treated with formaldehyde, first at room temperature, then between 60° and the reflux temperatures of the mixture, about 100° C. In the preferred embodiment of this invention, the aqueous formic acid is commercially available as 88% aqueous formic acid solution and the formaldehyde is commercially available as aqueous 37% formalin. Other concentrations are, however, operative. The reagent is used in excess of 5–25 times the required amount. The reaction period is from ½ to 3 hours. After the reaction is terminated, the product (II) is obtained by neutralizing the formic acid and extracting the organic product with an organic solvent. The product is further isolated and purified by conventional procedure, such as distillation, further extractions, chromatography, and crystallization.

The following preparations and examples are illustrative of the process and products of the present invention, but are not to be construed as limiting.

PREPARATION 1

3-(7-chloro-5-phenyl-3H-1,4-benzodiazepin-2-yl) carbazic acid ethyl ester

A mixture of 7-chloro-1,3-dihydro-5-phenyl-2H-1,4-benzodiazepine-2-thione (1.43 g.; 0.005 mole), ethyl carbazate (1.29 g.; 0.015 mole) and absolute ethanol (50 ml.) was refluxed for 14 hours with a slow stream of nitrogen bubbling through the mixture. The mixture was then concentrated to give a residue and the residue was crystallized from methylene chloride-ethyl acetate to give 1.38 g. (77% yield) of 3-(7-chloro-5-phenyl-3H-1,4-benzodiazepin-2-yl)carbazic acid ethyl ester of melting point 195.5–197.5° C. (dec.). The analytical sample, prepared by recrystallization from the above solvent mixture, had a melting point of 198–199° C. (dec.).

Analysis.—Calcd. for $C_{18}H_{17}ClN_4O_2$ (percent): C, 60.59; H, 4.80; Cl, 9.95; N, 15.70. Found (percent): C, 60.57; H, 4.37; Cl, 9.98; N, 15.40.

PREPARATION 2

8-chloro-2,4-dihydro-6-phenyl-1H-s-triazolo[4,3-a][1,4]benzodiazepin-1-one 3-(7-chloro - 4 - phenyl-3H-1,4-benzodiazepin-2-yl)carbazic acid ethyl ester (0.5 g.; 0.0014 mole) was heated under nitrogen at 197–207° C. for 15 minutes. The cooled melt was crystallized from ethanol to give 0.28 g. of 8 - chloro - 2,4 - dihydro - 6 - phenyl-1H-s-triazolo[4,3-a][1,4]benzodiazepin-1-one, which on recrystallization from ethanol had a melting point of 255–256° C.

Analysis.—Calcd. for $C_{18}H_{17}ClN_4O_2$ (percent): C, 61.84; H, 3.57; Cl, 11.42; N, 18.03. Found (percent): C, 61.44; H, 3.57; Cl, 11.46; N, 17.90.

PREPARATION 3

8-chloro - 2 - [2-(dimethylamino)ethyl] - 2,4 - dihydro-6-phenyl-1H-s-triazolo[4,3-a][1,4]benzodiazepin-1-one A solution of 8-chloro-2,4-dihydro-6-phenyl-1H-s-triazolo[4,3-a][1,4]benzodiazepine-1-one (1.56 g. 0.005 mole) in dry dimethylformamide (40 ml.) was treated with 0.232 g. (0.0055 mole) of a 57% suspension of sodium hydride in mineral oil and stirred at ambient temperature (22–24° C.) for 1 hour. It was then cooled in an ice bath, treated with 1.34 ml. (0.0055 mole) of a solution of 2-(dimethylamino)ethyl chloride in xylene (2 ml. of solution=1 g. of amine) and stirred at ambient temperatures for 18 hours. The mixture was concentrated to dryness in vacuo. The residue was crystallized from ether at 0° C. to give 0.62 g. of 8-chloro-2-[2-(diethylamino)ethyl]-2,4 - dihydro - 6 - phenyl-1H-s-triazolo[4,3-a][1,4]benzodiazepine-1-one of melting point 95–100° C. and 0.31 g. melting point 95–98° C. The analytical sample was crystallized from ethyl acetate-Skellysolve B hexanes and had a melting point of 98.5–100.5° C.

*Analysis.*—Calcd. for $C_{22}N_{24}ClN_5O$ (percent): C, 64.46; N, 5.90; Cl, 8.65; N, 17.09. Found (percent): C, 63.97; N, 5.96; Cl, 8.69; N, 17.10.

PREPARATION 4

8-chloro - 2 - [2 - (di-ethylamino)ethyl] - 2,4 - dihydro-6-phenyl-1H-s-triazolo[4,3-a][1,4]benzodiazepin - 1-one, its hydrobromide and its hydrochloride salts A solution of 3.1 g. (0.01 mole) of 8-chloro-2,4-dihydro-6-phenyl-1H - s - triazolo[4,3-a][1,4]benzodiazepine-1-one in 150 ml. of dry dimethylformamide was reacted with 0.463 g. (0.011 mole) of a 57% suspension of sodium hydride in mineral oil under a nitrogen atmosphere. The solution was refluxed for ½ hour and thereafter 2.4 ml. (0.011 mole) of a solution of 2-(diethylamino)ethyl chloride in xylene (2 ml. of solution=1 g. of amine) was added slowly to the refluxing mixture under stirring. After all the reactant had been added, the mixture was heated for one hour, stirred for an additional two hours at ambient temperatures and vacuum-distilled to remove dimethylformamide. The remaining product was extracted with ether. The ether extract was washed with brine, the water layer was twice more extracted with ether and the ether extracts were combined, dried, and evaporated. The oil, thus obtained, was treated with hydrogen bromide in ethanol to give 8-chloro-2-[2-(di-ethylamino)ethyl]-2,4-dihydro - 6 - phenyl-1H-s-triazolo[4,3-a][1,4]benzodiazepin-1-one hydrobromide. Recrystallization of this material from ethanol gave pure 8-chloro-2-[2-(di-ethylamino)ethyl]-2,4-dihydro - 6 - phenyl-1H-s-triazolo[4,3 - a][1,4]benzodiazepin-1-one hydrobromide of melting point 254–258° C.

PREPARATION 5

8-chloro - 2 - [2 - (diethylamino)ethyl]-2,4-dihydro-6-(o-chlorophenyl)-1H - s - triazolo[4,3-a][1,4]benzodiazepin-1-one and its hydrobromide A solution of 3.45 g. (0.01 mole) of 8-chloro-2,4-dihydro - 6 - (o - chlorophenyl)-1H-s-triazolo[4,3-a][1,4]benzodiazepin-1-one in dimethylformamide was treated with 0.78 ml. (0.011 mole) of thallous ethoxide. After 10 minutes 3 ml. (0.011 mole) of a solution of 2-(diethylamino)ethyl chloride in xylene was added, the mixture was stirred for 1¾ hours, filtered, and the solid extracted with dimethylformamide. The combined dimethylformamide solution was concentrated and the residue was treated with ice water to give the desired product. This product being an oil after attempted purification was converted to its hydrobromide salt with hydrogen bromide in ethanol, to give 2 g. of pure 8-chloro-2-[2-(diethylamino)ethyl]-2,4-dihydro - 6 - (o-chlorophenyl)-1H-s-triazolo[4,3-a][1,4]benzodiazepin-1-one hydrobromide of melting point 253.5–255° C.

*Analysis.*—Calcd. for $C_{22}H_{24}BrCl_2N_5O$ (percent): C, 50.30; H, 4.61; Br, 15.21; Cl, 13.50; N, 13.33. Found (percent): C, 50.01; H, 4.54; Br, 15.38; Cl, 13.63; N, 13.81.

PREPARATION 6

8-chloro - 2 - [3 - (dimethylamino)propyl]-2,4-dihydro-6-phenyl-1H - s-triazolo[4,3-a][1,4]benzodiazepin-1-one, its hydrobromide and its hydrochloride In the manner given in Preparation 3, 7-chloro-2,4-dihydro - 6 - phenyl-1H-s-triazolo[4,3 - a][1,4]benzodiazepin-1-one (3.1 g.; 0.01 mole) was treated with sodium hydride (0.011 mole) and then with 2-[3-(dimethylamino)propyl chloride (0.011 mole) to give 8-chloro-2-[3-(dimethylamino)propyl]-2,4-dihydro - 6 - phenyl-1H-s-triazolo[4,3-a][1,4]benzodiazepin-1-one as an oil. The hydrobromide of the product had a melting point of 281–283° C. The hydrochloride of the product had a melting point of 242–243° C.

PREPARATION 7

8-trifluoromethyl - 2 - (2-pyrrolidinoethyl)-2,4-dihydro-6-(o-chlorophenyl)-1H - s - triazolo[4,3-a][1,4]benzodiazepin-1-one In the manner given in Preparation 3, 8-trifluoromethyl - 2,4 - dihydro-6-(o-chlorophenyl)-1H-s-triazolo[4,3-a][1,4]benzodiazepin-1-one was treated with sodium hydride, and thereafter with (2-pyrrolidinoethyl) chloride to give 8-trifluoromethyl-2-(2-pyrrolidinoethyl)-2,4-dihydro - 6 - (o-chlorophenyl)-1H-s-triazolo[4,3-a][1,4]benzodiazepin-1-one.

PREPARATION 8

8-nitro - 2 - (2-morpholinoethyl)-2,4-dihydro-6-(o-chlorophenyl) - 1H - s - triazolo[4,3-a][1,4]benzodiazepin-1-one In the manner given in Preparation 3, 8-nitro-2,4-dihydro - 6 - (o-chlorophenyl)-1H-s-triazolo[4,3-a][1,4]benzodiazepin-1-one was treated with thallous ethoxide and thereafter with 2-morpholinoethyl bromide to give 8-nitro-2-(2-morpholinoethyl) - 2,4 - dihydro - 6 - (o-chlorophenyl)-1H-s-triazolo[4,3-a][1,4]benzodiazepin-1-one.

PREPARATION 9

10-diethylamino - 2 - [2-(4-methylpiperazino)ethyl]-2,4-dihydro - 6 - (2,6-difluorophenyl)-1H-s-triazolo[4,3-a][1,4]benzodiazepin-1-one In the manner given in Preparation 3, 10-diethylamino-2,4-dihydro-6-(2,6-difluorophenyl)-1H-s - triazolo[4,3-a]-[1,4]benzodiazepin-1-one was treated with sodium hydride and thereafter with 1 - (4 - methylpiperazino)ethyl chloride to give 10-diethylamino-2-[2-(4-methylpiperazino)ethyl]-2,4-dihydro-6-(2,6-difluorophenyl) - 1H - s-triazolo[4,3-a][1,4]benzodiazepin-1-one.

PREPARATION 10

9-propylsulfinyl-2-(3-piperidinopropyl) - 2,4 - dihydro-6-(p-methylphenyl)-1H-s - triazolo[4,3 - a][1,4]benzodiazepin-1-one In the manner given in Preparation 3, 9-propylsulfinyl-2,4-dihydro-6-(p-methylphenyl)-1H - s - triazolo[4,3-a]-[1,4]benzodiazepin-1-one was treated with potassium hydride, and thereafter with 3-piperidinopropyl bromide to give 9-propylsulfinyl-2-(3-piperidinopropyl)-2,4 - dihydro-6-(p-methylphenyl)-1H - s - triazolo[4,3 - a[1,4]benzodiazepin-1-one.

In the same manner given in the preceding preparations reacting other 2,4-dihydro-s-triazolobenzodiazepin-1-ones (I) with a base, and then with a selected aminoalkyl halide other 2-(aminoalkyl)-2,4-dihydro-6-phenyl-1H-s-triazolo[4,3-a][1,4]benzodiazepin - 1 - ones of Formula I are produced. Representative products, thus obtained, include:

8-dipropylamino-2-[3-(4-phenylpiperazino)propyl]-2,4-dihydro-6-(o-nitrophenyl)-1H-s-triazolo[4,3-a][1,4]benzodiazepin-1-one;

9-ethylthio-2-[3-(morpholino)propyl]-2,4-dihydro-6-(m-ethylthiophenyl)-1H-s-triazolo[4,3-a][1,4]benzodiazepin-1-one;

7,9-diethoxy-2-[3-(dimethylamino)propyl]-2,4-dihydro-6-(o-methoxyphenyl)-1H-s-triazolo[4,3-a][1,4]benzodiazepin-1-one;

7-iodo-4-methyl-2-[3-(diethylamino)propyl]-2,4-dihydro-6-(p-isopropoxyphenyl)-1H-s-triazolo[4,3-a][1,4]benzodiazepin-1-one;

7,8-dicyano-4-ethyl-2-[3-(dipropylamino)propyl]-2,4-dihydro-6-(2,4-dimethylphenyl)-1H-s-triazolo[4,3-a]-[1,4]benzodiazepin-1-one;

9-fluoro-4-propyl-2-[3-(dipropylamino)propyl]-2,4-dihydro-6-(p-nitrophenyl)-1H-s-triazolo[4,3-a][1,4]benzodiazepin-1-one;

8,9-dinitro-4-isopropyl-2-(2-morpholinoethyl)-2,4-dihydro-6-phenyl-1H-s-triazolo[4,3-a][1,4]benzodiazepin-1-one;

4,7,8-triethyl-2-(2-pyrrolidinoethyl)-2,4-dihydro-6-phenyl-1H-s-triazolo[4,3-a][1,4]benzodiazepin-1-one;

7,9-diisopropyl-2-(2-piperidinoethyl)-2,4-dihydro-6-(m-cyanophenyl)-1H-s-triazolo[4,3-a][1,4]benzodiazepin-1-one;

4,7-dipropyl-2-[2-(4-ethylpiperazino)ethyl]-2,4-dihydro-6-(o-fluorophenyl)-2,4-dihydro-1H-s-triazolo[4,3-a]-[1,4]benzodiazepin-1-one;

2-[2-(4-phenylpiperazino)ethyl]-2,4-dihydro-6-(p-iodophenyl)-1H-s-triazolo[4,3-a][1,4]benzodiazepin-1-one;

7,9-dinitro-2-[2-(diethylamino)ethyl]-2,4-dihydro-6-(o-nitrophenyl)-1H-s-triazolo[4,3-a][1,4]benzodiazepin-1-one;

and the like.

EXAMPLE 1

2',5-dichloro-2-[3-[(dimethylamino)methyl]-1 - hydroxymethyl-1,5-dihydro-5-oxo-4H - 1,2,4 - triazol - 4 - yl] benzophenone 8-chloro-2,4-dihydro-6-(o-chlorophenyl) - 1H - s - triazolo[4,3 - a][1,4]benzodiazepin-1 - one (1.378 g., 4.00 mmol) was dissolved in 5.24 g. (60.0 mmol) of 88% formic acid and treated with 2.70 ml. of 37% formalin. The orange colored solution was heated for 1.25 hours at 100° C. then worked up by quenching in cold aqueous 5% sodium hydroxide solution. The solution was extracted with chloroform and the chloroform extracts dried with anhydrous magnesium sulfate. The solvent was then removed in vacuo from the chloroform extracts to give a yellow oil which crystallized from ethyl acetate to give 0.82 g. of 2',5-dichloro-2-[3-[(dimethylamino)methyl]-1-hydroxymethyl-1,5-dihydro-5-oxo-4H-1,2,4-triazol - 4 - yl] benzophenone as a white powder. This was immediately recrystallized from ethyl acetate to yield 0.42 g. (25.0%) of the desired product as white flowers of melting point 154–162° C.

Analysis.—Calcd. for $C_{19}H_{18}Cl_2N_4O_3$ (percent): C, 54.17; H, 4.31; N, 13.30; Cl, 16.83. Found (percent): C, 54.22; H, 4.39; N, 13.51; Cl, 16.96.

EXAMPLE 2

5-chloro-2-[3-[(dimethylamino)methyl]-1 - [2 - (dimethylamino)ethyl]-1,5-dihydro-5-oxo - 4H - 1,2,4 - triazol-4-yl]benzophenone 8-chloro-2-[2-dimethylamino)ethyl]-2,4 - dihydro - 6-phenyl-1H-s-triazolo[4,3-a][1,4]benzodiazepin - 1 - one (0.4629 g., 1.00 mmol) was dissolved in 1.31 g. (15.0 mmol) of warm formic acid and treated with 0.675 ml. (9.0 mmol) of 37% formalin. The light yellow solution was heated for 1.5 hours at 100° C. then worked up by quenching with a cold aqueous 5% sodium hydroxide solution and extracted with chloroform. The extracts were combined, dried over anhydrous magnesium sulfate and concentrated in vacuo to give an oil which was crystallized from ethyl acetate/hexane to give 200 mg. (46.7%) of 5-chloro-2-[3 - [(dimethylamino)methyl] - 1 - [2 - (dimethylamino)ethyl]-1,5-dihydro-5-oxo-4H-1,2,4 - triazol-4-yl]benzophenone as prisms of melting point 85–88° C.

Analysis.—Calcd. for $C_{22}H_{26}ClN_5O_2$ (percent): C, 61.74; H, 6.12; N, 16.37; Cl, 8.29. Found (percent): C, 61.39; H, 6.27; N, 16.63; Cl, 8.31.

EXAMPLE 3

2'-chloro-1,5-dihydro-5-nitro - 2 - [1 - hydroxymethyl-3-[(dimethylamino)methyl]-5-oxo - 4H1,2,4 - triazol - 4-yl]benzophenone In the manner given in Example 1, a solution of 2,4-dihydro-8-nitro-6-(o-chlorophenyl)-1H - s - triazolo[4,3-a][1,4]benzodiazepin - 1 - one in formic acid was treated with aqueous formaldehyde to give 2'-chloro-1,5-dihydro-5 - nitro - 2 - [1 - hydroxymethyl - 3 - [(dimethylamino)methyl]-5-oxo-4H-1,2,4-triazol-4-yl]benzophenone.

EXAMPLE 4

2'-chloro-3'-ethoxy-5-trifluoromethyl - 2 - [3 - [2 - (pyrrolidinoethyl)]-1,5-dihydro-5-oxo-4H-1,2,4 - triazol - 4-yl]benzophenone In the manner given in Example 1, a solution of 8-trifluoromethyl-2-[2 - (pyrrolidino)ethyl] - 2,4 - dihydro-6-(o-chlorophenyl)-1H-s - triazolo[4,3 - a][1,4]benzodiazepin-1-one in formic acid was treated with aqueous formaldehyde to give 2'-chloro-6-trifluoromethyl - 2 - [3-(pyrrolidinoethyl)]-1,5-dihydro-5-oxo-4H - 1,2,4 - triazol-4-yl]benzophenone.

EXAMPLE 5

6-fluoro-3'-nitro-2-[3-[(dimethylamino)methyl] - 1 - (2-pyrrolidino)ethyl-1,5-dihydro-5-oxo-4H-1,2,4 - triazol-4-yl]benzophenone In the manner given in Example 1, a solution of 7-fluoro-2,4-dihydro-2-[2-(pyrrolidino)ethyl] - 6 -(m - nitrophenyl)-1H-s-triazolo[4,3 - a][1,4]benzodiazepin - 1-one in formic acid was treated with aqueous formaldehyde to give 6-fluoro-3'-nitro-2 - [3 - [(dimethylamino) methyl]-1-[(2-pyrrolidino)ethyl] - 1,5 - dihydro - 5 - oxo-4H-1,2,4-triazolo-4-yl]benzophenone.

EXAMPLE 6

4,3'-di(ethylthio) - 2 - [3 - [(dimethylamino)methyl]-1-[3-morpholinopropyl]-1,5-dihydro-5-oxo - 4H - 1,2,4-triazol-4-yl]benzophenone In the manner given in Example 1, a solution of 9-thioethyl-2,4-dihydro-2-[3-(morpholino)propyl] - 6 - (m-ethylthiophenyl) - 1H-s-triazolo[4,3-a][1,4]benzodiazepine-1-one in formic acid was treated with aqueous formaldehyde to give 4,3'-di(ethylthio)-2-[3-[(dimethylamino) methyl]-1-[3-(morpholino)propyl]-1,5-dihydro - 5 - oxo-4H-1,2,4-triazol-4-yl]benzophenone.

EXAMPLE 7

5,6-dicyano-2',4'-dimethyl - 2 - [3 - [1-(dimethylamino) propyl]-1-[(3-(dipropylamino)propyl] - 1,5 - dihydro-5-oxo-4H-1,2,4-triazol-4-yl]benzophenone In the manner given in Example 1, a solution of 7,8-dicyano-4-ethyl-2-[3-(dipropylamino)propyl] - 2,4 - dihydro-6-(2,4-dimethylphenyl) - 1H - s - triazolo[4,3-a][1,4] benzodiazepin-1-one in formic acid was treated with aqueous formaldehyde to give 5,6-cyano-2',4'-dimethyl-2-[3-[1-(dimethylamino)propyl] - 1 - [3-(dipropylamino) propyl]-1,5-dihydro-4-oxo-4H-1,2,4-triazol - 4 - yl]benzophenone.

EXAMPLE 8

4,6-diisopropyl-3'-cyano - 2 - [3-[(dimethylamino)methyl]-1-[2-(piperidinoethyl)]-1,5-dihydro - 5 - oxo - 4H-1,2,4-triazol-4-yl]benzophenone In the manner given in Example 1, a solution of 7,9-diisopropyl-2-[2-(piperidinoethyl)]-2,4-dihydro - 6 - (m-cyanophenyl) - 1H - s-triazolo[4,3-a][1,4]benzodiazepin-1-one in formic acid was treated with aqueous formaldehyde to give 4,6-diisopropyl-3'-cyano - 2 - [3-[dimethylamino)methyl]-1-[(2-piperidinoethyl)] - 1,5 - dihydro-5-oxo-4H-1,2,4-triazol-4-yl]benzophenone.

EXAMPLE 9

6-propyl-2'-fluoro - 2 - [3 - [1-(dimethylamino)butyl]-1-[2-(4-ethylpiperazino)ethyl]-1,5-dihydro - 5 - oxo-4H-1,2,4-triazol-4-yl]benzophenone In the manner given in Example 1, a solution of 4,7-dipropyl-2-[2-(4-ethylpiperazino)ethyl] - 2,4 - dihydro - 6-(o-fluorophenyl) - 1H - s-triazolo[4,3-a][1,4]benzodiazepin-1-one in formic acid was treated with aqueous formaldehyde to give 6-propyl-2'-fluoro-2-[3-[1-dimethylamino) butyl]-1-[2-(4-ethylpiperazino)ethyl] - 1,5 - dihydro - 5-oxo-4H-1,2,4-triazol-4-yl]benzophenone.

EXAMPLE 10

2'-fluoro-1,5-dihydro - 2 - [3-[(dimethylamino)methyl]-1-hydroxymethyl-5-oxo-4H-1,2,4-triazol - 4 - yl]benzophenone In the manner given in Example 1, a solution of 2,4-dihydro-6-(o-fluorophenyl) - 1H - s-triazolo[4,3-a][1,4] benzodiazepin-1-one in formic acid was treated with aqueous formaldehyde to give 2'-fluoro-1,5-dihydro-2,3[(dimethylamino)methyl]-1-hydroxymethyl - 5 - oxo-4H-1,2,4-triazol-4-yl]benzophenone.

In the manner given in the preceding examples other 2-[(dimethylamino)alkyl]-1,5-dihydro-5-oxo - 1 - substituted-4H-1,2,4-triazol-4-yl]benzophenones of Formula II can be produced by reacting a corresponding 1-substituted - 5 - phenyl-4H-s-triazolo[4,3-a][1,4]benzodiazepine of Formula I in formic acid solution with formaldehyde.

Representative compounds, thus obtained, include:

3',4-diethylthio-2-[3-[(dimethylamino)methyl]-1,5-dihydro-1-(3-morpholinopropyl)-5-oxo-4H-1,2,4-triazol-4-yl]benzophenone;

4-iodo-4'-isopropoxy-2-[3-[(dimethylamino)methyl]-1,5-dihydro-1-[3-(diethylaminopropyl]-5-oxo-4H-1,2,4-triazol-4yl]benzophenone;

4-fluoro-2-[3-[1-(dimethylamino)propylmethyl]-1,5-dihydro-1-[3-(dipropylamino)propyl]-5-oxo-4H-1,2,4-triazol-4-yl]benzophenone;

5,6-diethyl-[3-[1-(dimethylamino)propyl]-1,5-dihydro-2-[2-pyrrolidinoethyl]-5-oxo-4H-1,2,4-triazol-4-yl]benzophenone;

2',4,6-trinitro-2-[3-[(dimethylamino)methyl]-1,5-dihydro-1-[2-[(diethylamino)ethyl]-5-oxo-4H-1,2,4-triazol-4-yl]benzophenone;

6-fluoro-2'-nitro-2-[3-(dimethylamino)methyl]-1-(2-pyrrolidinoethyl)-5-oxo-4H-1,2,4-triazol-4-yl] benzophenone;

3-isopropyl-4'-propylthio-2-[3-[(dimethylamino) methyl]-1,5-dihydro-1-(3-morpholinopropyl)-5-oxo-4H-1,2,4-triazol-4-yl]benzophenone;

3,5-diethoxy-2-[3-[(dimethylamino)methyl]-1,5-dihydro-1-methylhydroxy-5-oxo-4H-1,2,4-triazol-4-yl]benzophenone;

3-bromo-5-fluoro-2'-methyl-2-[3-[(dimethylamino) methyl]-1,5-dihydro-2-[2-(4-methylpiperazino) ethyl]-5-oxo-4H-1,2,4-triazol-4-yl]benzophenone;

and the like.

The compounds (II) of the foregoing examples are converted to acid addition salts by reaction with stoichiometrically calculated amounts of selected acids in water, ethanol, or with the hydrogen halides in particular, in ether. In this manner the hydrochlorides, hydrobromides, hydroiodides, sulfates, phosphates, acetates, propionates, lactates, tartrates, citrates, maleates, malates, pamoates, benzenesulfonates, p - toluenesulfonates, methanesulfonates, cyclohexanesulfamates, salicylates and the like of the compound of Formula II are obtained.

I claim:

1. A compound selected from the group consisting of a 2-[3-[1-(dimethylamino)alkyl]-1,5-dihydro - 5 - oxo-1-substituted-4H-1,2,4-triazol-4-yl]benzophenone of the formula II:

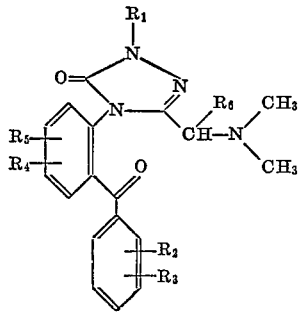

(II)

wherein $R_1$ is selected from the group consisting of hydroxymethyl and

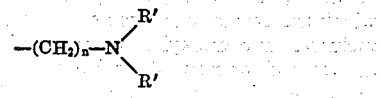

in which $n$ is 2 or 3 and $R'$ is alkyl of 1 to 3 carbon atoms, inclusive, or together

is a heterocyclic ring moiety selected from the group consisting of pyrrolidino, piperidino, morpholino, and 4-alkylpiperazino in which alkyl is defined as above; wherein $R_2$, $R_3$, $R_4$, and $R_5$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino, in which the carbon chain moiety is of 1 to 3 carbon atoms, and dialkylamino in which alkyl is defined as above; and wherein $R_6$ is hydrogen or alkyl defined as above, and the pharmacologically acceptable acid addition salts thereof.

2. A compound according to claim 1, wherein $R_6$ is hydrogen.

3. The compound according to claim 2, wherein $R_1$ is hydroxymethyl, $R_2$ is o-chloro, $R_4$ is 5-chloro, $R_3$ and $R_5$ are hydrogen and the compound is therefore 2',5-dichloro-2-[3-[(dimethylamino)methyl]-1,5-dihydro-1-hydroxymethyl-5-oxo-4H-1,2,4-triazol-4-yl]benzophenone.

4. The compound according to claim 2, wherein $R'$ is methyl, $R_1$ is (dimethylamino)ethyl, $R_4$ is 5-chloro, $R_2$, $R_3$, and $R_5$ are hydrogen and the compound is therefore 5-chloro, 2-[3-[(dimethylamino)methyl]-1-(2 - dimethylamino)ethyl]-1,5-dihydro - 5 - oxo-4H-1,2,4-triazol-4-yl]benzophenone.

5. A process for the production of a 2-[3-[1-(dimethylamino)alkyl] - 1,5-dihydro-5-oxo-1-substituted-4H-1,2,4-triazol-4-yl]benzophenone of the Formula II:

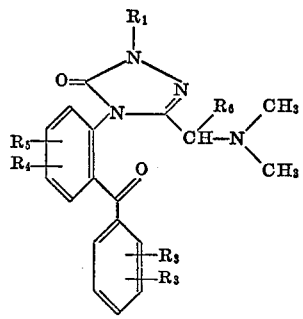

(II)

wherein $R_1$ is selected from the group consisting of methylhydroxy and

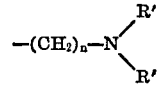

in which $n$ is 2 or 3 and $R'$ is alkyl of 1 to 3 carbon atoms, inclusive, or together

is a heterocyclic ring moiety selected from the group consisting of pyrrolidino, piperidino, morpholino, and 4-alkylpiperazino in which alkyl is defined as above; wherein $R_2$, $R_3$, $R_4$, and $R_5$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino, in which the carbon chain moiety is of 1 to 3 carbon atoms, inclusive, and dialkylamino in which alkyl is defined as above; and wherein $R_6$ is hydrogen or alkyl defined as above, which comprises: heating a 2-substituted-5-phenyl-4H-s-triazolo[4,3-a][1,4]benzodiazepin-1-one:

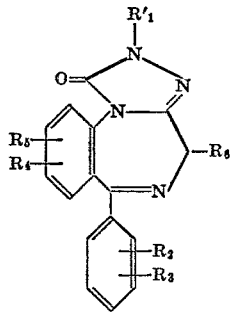
(I)

wherein $R'_1$ is selected from the group consisting of hydrogen and

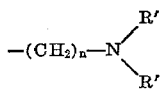

defined as above and wherein $R_2$, $R_3$, $R_4$, $R_5$ and $R_6$ have the significance as above, in formic acid solution with aqueous formaldehyde at 60–100° C., to obtain the compound of Formula II above.

References Cited

Derieg et al.: Chemical Abstracts, vol. 74, Abstract No. 125579(e) (1971).

ALTON D. ROLLINS, Primary Examiner

U.S. Cl. X.R.

71—92; 99—2 G; 260—239 BD, 239.3 D, 247.1, 247.2 A, 268 H, 293.69; 424—248, 250, 267, 269